United States Patent [19]

Thurm et al.

[11] Patent Number: 5,008,148
[45] Date of Patent: Apr. 16, 1991

[54] PROCESS FOR THE PRODUCTION OF PLASTIC MOULDED ARTICLES WITH IMPROVED WEATHERING RESISTANCE

[75] Inventors: Siegfried Thurm, Meerbusch; Reimer Holm, Bergisch-Gladbach; Christian Leuschke, Dormagen; Dietrich Rathmann, Leverkusen; Lutz Schrader, Krefeld, all of Fed. Rep. of Germany

[73] Assignee: Bayer Aktiengesellschaft, Bayerwerk, Fed. Rep. of Germany

[21] Appl. No.: 366,719

[22] Filed: Jun. 12, 1989

[30] Foreign Application Priority Data

Jun. 23, 1988 [DE] Fed. Rep. of Germany ....... 3821131

[51] Int. Cl.$^5$ ............................................... B32B 27/36
[52] U.S. Cl. ..................................... 428/336; 427/42; 427/160; 427/248.1; 427/296; 428/412; 428/697; 428/702
[58] Field of Search ............ 427/42, 255.3, 160, 427/294, 296, 248.1; 428/336, 412, 697, 702

[56] References Cited

U.S. PATENT DOCUMENTS 3,354,129 11/1967 Edmonds, Jr. et al. .............. 260/79
3,927,228 12/1975 Pulker ................................. 427/162
4,048,372 9/1977 Ando et al. .......................... 428/412
4,419,399 12/1983 Ichikawa et al. .................... 428/215
4,552,791 11/1985 Hahn ..................................... 428/35
4,645,825 2/1987 Idel et al. ............................ 528/388
4,842,941 6/1989 Devin et al. ......................... 428/412

FOREIGN PATENT DOCUMENTS 2132229 7/1984 United Kingdom .

OTHER PUBLICATIONS

Tobin & Dominov, "Soc. J. Opt. Tech," vol. 41, No. 10, 1974, pp. 492–499.
Applied Physics Letters, vol. 39, No. 8, Oct. 15, 1981, pp. 640–642.
Thin Solid Films, vol. 124, No. 1, Feb. 1985, pp. 43–47, T. Miniami et al.
Thin Solid Films, vol. 127, No. 1/2, May 1985, pp. 107–114, B. A. Banks et al.

Primary Examiner—Bernard Pianalto
Attorney, Agent, or Firm—Joseph C. Gil; Aron Preis

[57] ABSTRACT

This invention relates to a process for coating moulded plastic articles of thermoplastic polycarbonates or thermoplastic polyarylene sulphides with metal oxides, to the moulded plastic articles obtainable by the process according to the invention and to their technological application for outdoor use, for example for the production of coverings or facings in the building industry.

14 Claims, 2 Drawing Sheets

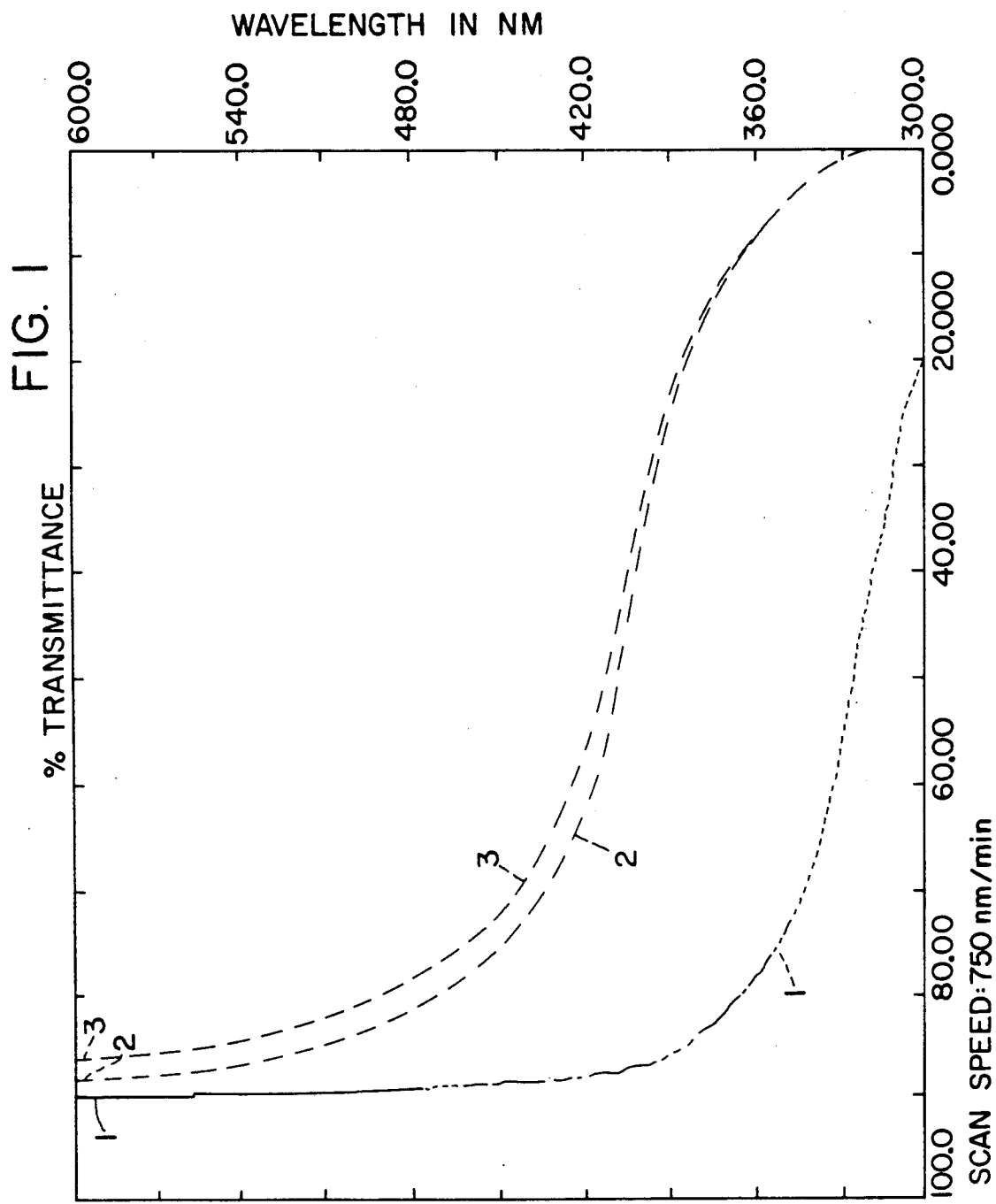

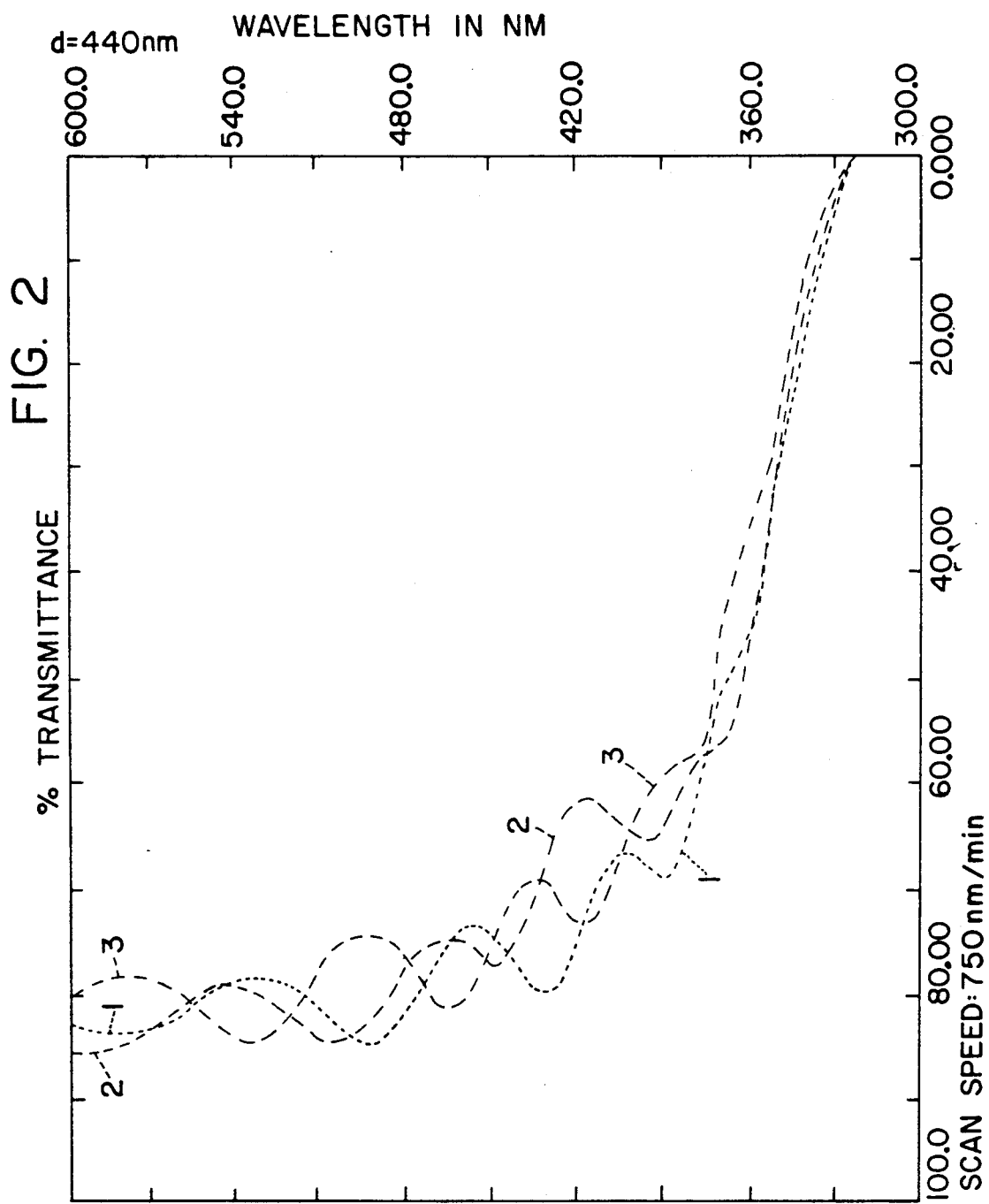

PROCESS FOR THE PRODUCTION OF PLASTIC MOULDED ARTICLES WITH IMPROVED WEATHERING RESISTANCE

The present invention relates to a process for coating moulded plastic articles of thermoplastic polycarbonates or thermoplastic polyarylene sulphides, characterised in that the moulded articles are coated with metal oxides which absorb electromagnetic radiation at wavelengths from 250 nm to 400 nm and in particular from 270 nm to 400 nm.

The invention further relates to the moulded plastic articles obtainable by the process according to the invention.

The moulded plastic articles produced by the process according to the invention have good resistance to the influences of the external atmosphere, i.e. to UV light, moisture and fluctuations in temperature, and thus have good weathering resistance.

They maintain their plastic properties over a long period, for example as regards their mechanical and their optical properties.

Inorganic protective layers for plastics are already known (see, for example, I. D. Torbin and Yu. F. Dominov, Soc. J. Opt. Technol., volume 41, No. 10, 1974, pages 492 to 499, in particular pages 495, right hand column to page 496, left hand column) but the inorganic compounds mentioned in the said reference either do not absorb in the spectral region claimed or also absorb at wavelengths above 400 nm so that they are not transparent. These layers serve to improve the scratch resistance and the antistatic and electrical properties and reduce the reflection of optical structural parts made of plastics.

It is also known to combine $TiO_2$ coatings which absorb in the range according to the present invention with other layers of inorganic compounds for reducing the reflection of optical parts made of plastics (see, for example, JA No. 57 194 902).

EP-A No. 0,113,555 discloses new packaging materials consisting of various plastics which are coated with metal oxides so that they protect the wrapped material against oxygen, water vapour and ultraviolet light. The plastics mentioned include neither polycarbonates nor polyarylene sulphides, nor is it the aim of EP-A No. 0,113,555 to protect the plastics against the effects of weathering.

According to APPLIED PHYSICS LETTERS, Vol. 39, No. 8, 15. Oct. 1981, pages 640–642, American Institute of Physics, New York, US; J. B. Webb et al: "Transparent and highly conductive films of ZnO prepared by reactive magneton sputtering", ZnO is applied to glass in order to produce conductive transparent layers.

According to "THIN SOLID FILMS", Vl. 124, No. 1, Feb. 1985, Pages 43–47, Elsevier Lequoia, Lausanne, Switzerland; T. MINAMI et al: "Highly conductive and transparent ZnO thin films prepared by R.F. magneton sputtering in an applied external D.C. magnetic field", ZnO is applied to glass in combination with $Al_2O_3$ in order, as above, to produce conductive transparent layers.

According to U.S. Pat. No. 4,048,372 cadmium stannate is applied as an outer layer to coated plastic substrates which already contain metal oxides such as $TiO_2$. The metal oxides serve the purpose of improving the adhesion of cadmium stannate. The plastic substrates coated in this manner are used as transparent, electrically conductive articles. The plastics mentioned also include polycarbonate. Thus, in the US patent the coating provides transparency, whereas according to the present invention the coating serves the purpose of absorbing electromagnetic radiation.

In U.S. Pat. No. 4,552,791 plastics having reduced permeability to gas are produced, various metal oxides, such as Si-monoxide, aluminium oxide, titanium oxide or tantalum oxide, but not $TiO_2$, being used as the coating. The oxides mentioned in the US patent are ineffective according to the present invention.

According to THIN SOLID FILMS, Vol. 127, No. ½, May 1985, pages 107–114, Elsevier Lequoia, Lausanne, Switzerland; B. A. BANKS et al: "Sputtered coatings for protection of spacecraft polymers", $Al_2O_3$ and $SiO_2$ are used, together with a small amount of polytetrafluoroethylene, for coating polyimide plastics in order to protect them against oxidation in space travel. The oxides used are ineffective according to the present invention.

According to FR-A No. 2,230,754 glass is coated with titanium oxides in order to produce a laminated material with a defined refractive index.

The thermoplastic polycarbonates to be protected are known from the literature and should preferably have weight average molecular weights $\overline{M}w$ of about 10,000 to 200,000, preferably 20,000 to 100,000, the $\overline{M}w$ being determined in a known manner by gel chromatography.

The thermoplastic polyarylene sulphides are also known from the literature (see U.S. Pat. No. 3,354,129 and EP-OS No. 0,171,021 and the literature referred to in EP-OS No. 0,171,021).

They should have weight average molecular weights $\overline{M}w$ of about 30 000 to 50 000. $\overline{M}w$ is determined in a known manner by high-temperature gel-chromatography.

Examples of suitable metal oxides which absorb in the claimed range of wave lengths include $TiO_2$, $SnO_2$ and ZnO.

The coating of the moulded plastic articles with the metal oxides is carried out in a vacuum vapour deposition plant in which the moulded plastics product is fixed to a substrate holder. The process is carried out in a vacuum of at the most about $1 \times 10^{-5}$ mbar. The metal oxide is vaporized by means of an electron beam gun and it is important to insert a moveable shield between the electron beam gun and the fixed moulded article to prevent premature vapour deposition on the moulded plastic article during the heating up phase of the metal oxide.

The vapour deposition of the metal oxide is carried out at temperatures from about 1500K to about 3000K.

It is advisable in many cases to carry out a low pressure plasma treatment on the substrate in a gas atmosphere, for example argon or $O_2$, at a pressure of about $5 \times 10^{-2}$ mbar, before the vapour deposition of the protective film in order to remove any impurities present from the substrate and thereby improve adherence of the protective layer to the substrate.

The metal oxide is first heated by the electron beam gun at a power to 4 to 6 kW to raise its temperature to about 1500–3000K. The pivotal shield between the moulded plastic article and the electron beam gun is then removed and coating of the moulded article is begun.

The thickness of the protective layer may be controlled during the vapour deposition process, for example by means of a piezoelectric quartz layer thickness measuring instrument. The stoichiometric composition of the protective layer may be adjusted by the addition of reactive gases, $O_2$ being used in the case of $TiO_2$. The term "$TiO_2$ layer" used hereinafter should therefore always be taken to mean a layer in which the ratio of the number of Ti atoms to the number of oxygen atoms is from 0.5 to 1.

The same applies to the application of other metal oxides.

The layer thickness of the metal oxides are from 40 to 2000 nm, preferably from 50 to 1000 nm.

When a metal oxide layer of sufficient thickness has been deposited on the moulded article, for example a $TiO_2$ layer of 440 nm, the pivotal shield is reintroduced between the substrate holder and the electron beam gun and the gun is switched off. It is advisable to design the substrate holder so that it is moveable, e.g. rotatable, in order to obtain a metal oxide layer of more uniform thickness.

In an alternative procedure, the layer of metal oxide may be applied to the moulded plastic article by vaporizing the metal, either alone or as a mixture with metal oxide, in an oxygen atmosphere, optionally using resistance heated or inductively heated vaporizers instead of an electron beam gun for vaporization.

A third method of applying the metal oxide layer is the so called direct voltage or high frequency sputtering of the metal oxide or the reactive direct voltage or high frequency sputtering of the corresponding metal (cathode atomization process).

A fourth method of applying the metal oxide layer is ion plating.

A fifth method of applying the metal oxide layer to the moulded plastic article is the so called "plasma supported" coating process, in which the plastic article is situated in a high frequency or microwave plasma and the metal oxide is produced from a metal compound capable of being degraded oxidatively and oxygen.

Examples of such oxidatively degradable metal compounds include $Ti[O-CH_2CH(CH_3)_2]_4$, $Ti(O-iso-C_3H_7)_4$, $TiCl_4$, $Sn(CH_3)_4$ and $Zn(C_2H_5)_2$.

The moulded plastic articles which may suitable be coated by the process according to the invention may be, for example, boards such as solid or hollow boards, sheet products, window panes for motor vehicles, headlamp shields for motor vehicles and moulded articles of all types and dimensions used out of doors, for example as coverings or facings in the building industry.

EXAMPLE

A $TiO_2$ layer 440 nm in thickness is applied as follows to a polycarbonate board (100 mm × 200 mm × 3 mm) of bisphenol-A-homopolycarbonate: the moulded article is fixed to a rotatable substrate holder in a vapour deposition installation of Leybold Heraeus GmbH, Model A 1100. The chamber of the deposition installation is then closed and evacuated to about $1 \times 10^{-5}$ mbar. Ar is then introduced to a pressure of $5 \times 10^{-2}$ mbar and the drive for rotating the substrate holder is switched on so that the holder rotates at the rate of 20 revs per min. A voltage of 600 V is then applied by application of a voltage to an aluminium plate connected as cathode, and a low pressure plasma is ignited. In this plasma, the moulded article is treated for 5 minutes at 120 W. The voltage is then switched off, the introduction of Ar is terminated and the container is again evacuated to $1 \times 10^{-5}$ mbar.

When this pressure has been reached, the electron beam gun is switched on and the $TiO_2$ which is to be vaporized is heated to about 2500K within 2 minutes by the application of a power of 6 kW. The moveable shield between the electron beam gun and the substrate holder is then removed and the moulded article is coated for 440 seconds at a vapour deposition rate of 1 nm/sec. The moveable shield is then reintroduced between the electron beam gun and the substrate holder and the coating process is thus completed. When the electron beam gun has been switched off and the vaporized material has cooled down, the chamber of the vapour deposition installation is ventilated after a period of 15 minutes and the coated moulded article is removed from the installation.

The coated polycarbonate product is then subjected to weathering in a weatherometer for 306 hours and 680 hours together with a similar but uncoated moulded article. The samples are exposed to a source of UV radiation which has an intensity maximum at about 310 nm and sprayed with cold water at 30° C. at intervals of 20 minutes at an ambient temperature of 35° C. After 306 hours and 680 hours, both samples are removed from the weatherometer and the optical transmission between 30 and 600 nm is measured. FIG. 1 shows the transmission of the polycarbonate article without protective layer.

Curve 1 represents the transmission before weathering, curve 2 the transmission after 306 hours weathering and curve 3 after 680 hours weathering. There is clearly a strong absorption in the blue spectral region between 380 and 420 nm after 306 hours and 680 hours weathering, resulting in yellow discolouration of the plastics material due to the products of reaction of the degradation of the polycarbonate.

FIG. 2 shows the transmission of the polycarbonate moulded article which has been covered with a 440 nm protective layer of $TiO_2$.

Curve 1 shows the transmission of the sample before weathering, curve 2 the transmission after 306 hours weathering and curve 3 the transmission after 680 hours weathering. It is clear that in contrast to the transmission curve of the uncoated polycarbonate article in FIG. 1, no reduction in transmission is found between 380 and 420 nm, i.e. the yellow discolouration of the sample characteristic of the degradation of the polycarbonate does not occur.

The measurements for FIGS. 1 and 2 were carried out with a Beckman DK-50 Spectral Photometer.

We claim:

1. Process for coating moulded plastic articles of thermoplastic polycarbonates or thermoplastic polyarylene sulphides, characterised in that the moulded plastic articles are directly coated with metal oxides which absorb electromagnetic radiation at wave lengths of from 250 nm to 400 nm.

2. Process according to claim 1, characterised in that the moulded plastic articles are coated with metal oxides which absorb radiation from 270 nm to 400 nm.

3. Moulded plastic articles obtainable by the process according to claim 1.

4. A process for coating molded plastic articles comprising applying directly to a surface of said article a layer of metal oxide capable of absorbing electromagnetic radiation at wave lengths of from 250 nm to 400 nm, said article being molded from thermoplastic polycarbonate or thermoplastic polyarylene sulphide and said metal oxide being selected from the group consisting of titanium dioxide, tin dioxide and zinc oxide.

5. A process for coating molded plastic articles comprising applying to a surface of said article a layer of metal oxide capable of absorbing electromagnetic radiation at wave lengths of from 250 nm to 400 nm, said article being molded from thermoplastic polycarbonate or thermoplastic polyarylene sulphide and said metal oxide being selected from the group consisting of titanium dioxide and zinc oxide.

6. A molded plastic article prepared by the process of claim 5.

7. A process for coating a molded plastic article comprising applying to a surface of said article a layer of non-conductive metal oxide having a thickness greater than 100 nm and smaller than 2000 nm and having the capability of absorbing electromagnetic radiation at wave length of from 250 nm to 400 nm, said article being molded from thermoplastic polycarbonate or thermoplastic polyarylene sulfide and said metal oxide being selected from the group consisting of titanium dioxide and zinc oxide.

8. The article prepared by the process of claim 7.

9. A process for coating a molded article comprising applying to a surface of said article a layer of titanium dioxide having a thickness of about 440 nm and the capability of absorbing electromagnetic radiation at wave length of from 250 to 400 nm, said article being molded from thermoplastic polycarbonate or thermoplastic polyarylene sulfide.

10. The article prepared by the process of claim 9.

11. A process for coating a molded plastic article comprising applying to a surface of said article a layer of non-conductive metal oxide having the capability of absorbing at least about 80% of the electromagnetic radiation at wave length of from 280 to 330 nm, said article being molded from thermoplastic polycarbonate or thermoplastic polyarylene sulfide and said metal oxide being selected from the group consisting of titanium dioxide and zinc oxide.

12. The article prepared by the process of claim 11.

13. A process for coating a molded plastic article comprising applying to a surface of said article a non-conductive layer of titanium dioxide having the capability of absorbing at least about 80% of the electromagnetic radiation at wave length of from 280 to 330 nm, said article being molded from thermoplastic polycarbonate or thermoplastic polyarylene sulfide.

14. The article prepared by the process of claim 13.

* * * * *